(No Model.) 2 Sheets—Sheet 1.
R. R. BALL.
ADJUSTABLE HANDLE BAR.

No. 602,421. Patented Apr. 19, 1898.

Witnesses
R. H. Newman
Harriet L. Slason

Inventor
ROBERT R. BALL
By Chamberlain & Newman
his Attorneys (No Model.) 2 Sheets—Sheet 2.

R. R. BALL.
ADJUSTABLE HANDLE BAR.

No. 602,421. Patented Apr. 19, 1898.

Witnesses.
R. H. Newman,
Harriet L. Slason,

Inventor.
Robert R. Ball
By
Chamberlain & Newman
Attorneys

UNITED STATES PATENT OFFICE.

ROBERT R. BALL, OF BRIDGEPORT, CONNECTICUT.

ADJUSTABLE HANDLE-BAR.

SPECIFICATION forming part of Letters Patent No. 602,421, dated April 19, 1898.

Application filed October 31, 1896. Serial No. 610,654. (No model.)

*To all whom it may concern:*

Be it known that I, ROBERT R. BALL, a citizen of the United States, and a resident of Bridgeport, in the county of Fairfield and State of Connecticut, have invented certain new and useful Improvements in Adjustable Handle-Bars, of which the following is a specification.

This invention relates to new and useful improvements in means for quickly adjusting the handle-bars of bicycles, tricycles, and the like.

It is the object of my invention to provide means for quickly and easily adjusting the handle-bar of a bicycle or the like while the same is in use without the necessity of dismounting from the wheel or using a tool of any kind. It is further an object to accomplish said result with simple, light, and durable mechanism in the most desirable manner.

Upon the accompanying drawings, forming a part of this specification, the same numerals of reference denote like or corresponding parts upon the several figures, and of which—

Figure 1:
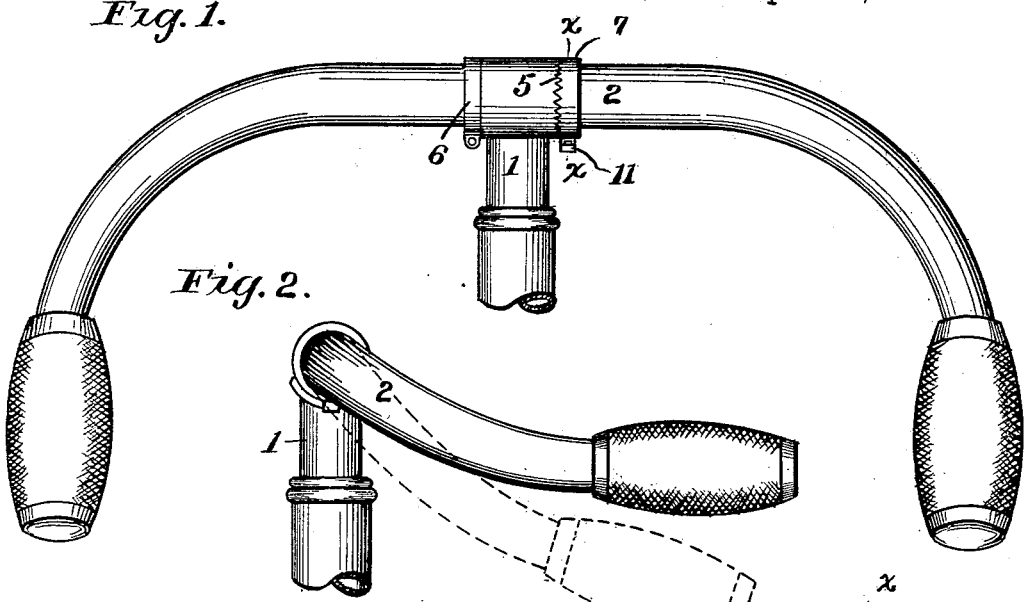
Figure 2:
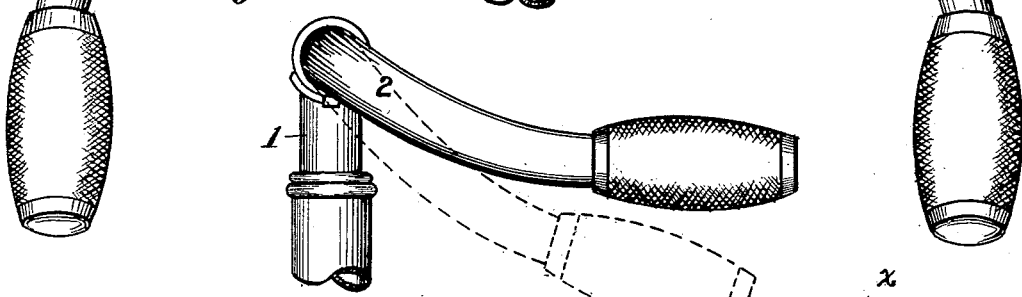
Figure 3:
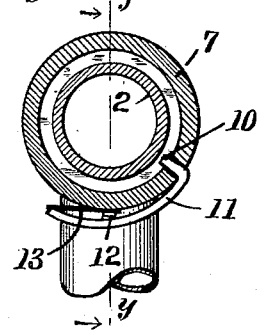
Figure 4:
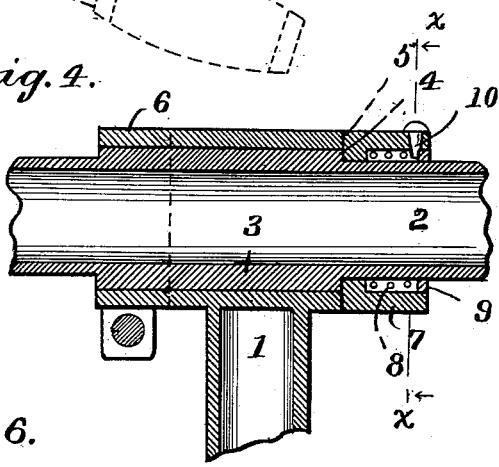
Figure 5:
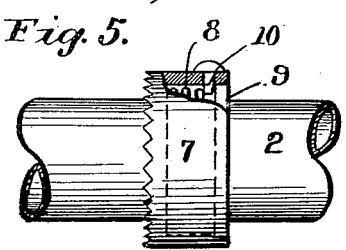
Figure 6:
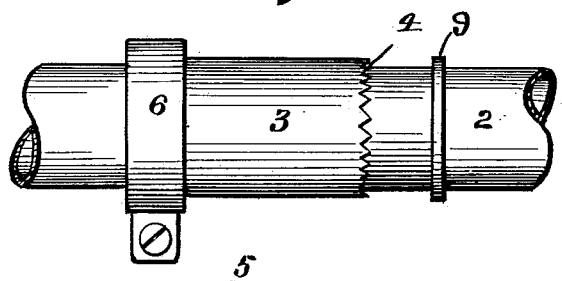
Figure 7:
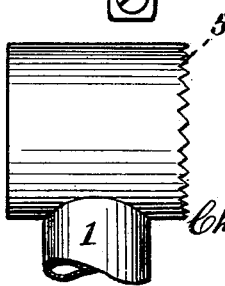
Figure 8:
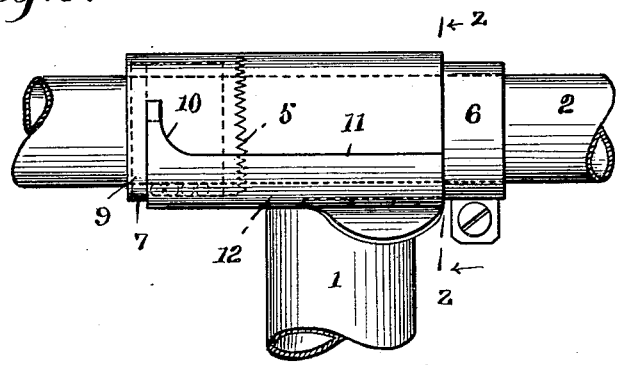
Figure 9:
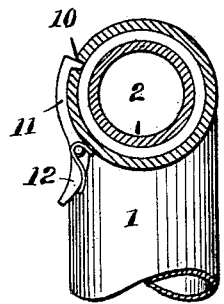
Figure 10:

Figure 1 shows a rear elevation of a handle-bar attached to the head of a wheel by my novel means of adjustment. Fig. 2 is a side elevation of Fig. 1 and shows in dotted lines a lowered position of the handle-bar. Fig. 3 is a vertical cross-section on line $x$ $x$ of Figs. 1 and 4. Fig. 4 is a central vertical longitudinal section taken on line $y$ $y$ of Fig. 3. Fig. 5 shows a portion of a handle-bar and a slidable clutch member forming part of my adjusting mechanism mounted thereon. Fig. 6 also shows a detail of the handle-bar having thereon an enlargement forming a clutch member. Fig. 7 is a detail view of the head of the wheel, which also has a toothed surface forming a part of the clutch members shown in Fig. 6. Both of said parts are engaged and disengaged by the slidable member shown in Fig. 5. Fig. 8 is a rear elevation of a slight modification, the same showing the clutch upon the opposite side from that of the preceding figures. Fig. 9 is a detail cross-section on line $z$ $z$ of Fig. 8. Fig. 10 is a detached rear view of the lever carrying the locking-key.

Referring to the numerals of reference, 1 represents an especially-constructed head of a bicycle; 2, the handle-bars, which are formed integral with each other and may be of any special design with relation to bend or curvature. Said bars are provided with an enlargement 3 in its center and directly adjacent to the head 1 of the wheel. One end of said enlargement is serrated, as at 4, and forms a clutch member for the handle-bar.

The head 1, before mentioned, is of special construction and bored to receive the enlargement upon the handle-bar before mentioned. It is also serrated upon one edge, as at 5, which serration corresponds and registers with the serrations 4 upon the enlargement 3 of the handle-bar before mentioned. At one side of said head is provided a collar 6, which is clamped to the handle-bar and serves to hold the latter in its proper position within said head. Upon the opposite edge of said head and upon the handle-bar is provided a movable clutch member 7, which is slidably fitted upon said handle-bar and is provided with teeth corresponding to and for the purpose of engaging the serrations 4 and 5 of the enlargement of the handle-bar and head, respectively.

Within the movable clutch member 7 is provided a spring 8, one end of which abuts against the collar 9, fixed to the handle-bar, the other end engaging said collar and serving to retain the latter up against and into engagement with the serrations of the head and handle-bar before mentioned. In order to lock said movable clutch member and its bar in position, I provide a key 10, (see Figs. 3 and 10,) which is mounted upon the lever 11, pivoted at 12 to the clutch member 7 and passes freely through an opening in said member. The lever 11 is provided with a spring 13, which tends to hold said key in against the side of the collar 9, and thus lock said clutch member against any outward movement. It will thus be apparent that when the inner end of the lever is operated by the rider the keyed end will be withdrawn from between the clutch and its shoulder 9, leaving the spring-actuated movable clutch member 7 free to engage or disengage the serrations in the head and handle-bar whenever the latter is rotated. The spring 8 permits a reciprocal movement of the clutch member 7, but keeps it in contact with the said serrations of the head and handle-bar and causes it to adjust itself in engagement therewith in whatever position the handle-bar rests. After said adjustment is complete the rider would release key 10, which instantly locks the clutch member 7 by reëngaging the collar 9. It will further be obvious that when so locked the greater the force applied to the handle-bar the firmer the engagement of said key and collar.

In Fig. 8 of the drawings it will be apparent that I have slightly altered the shape of the lever 11, and also pivot it to the head of the bicycle instead of to the clutch member, as in the preceding figures. This is done to better adapt it to the change of placing the movable clutch member upon the opposite side of the fixed member.

Having thus described my invention, what I claim, and desire to secure by Letters Patent, is—

1. An adjustable handle-bar consisting of a head in which said bar operates, a collar upon said bar, fixed and movable clutch members, a spring-actuated key-lever pivoted to said movable member and adapted to engage the collar upon the bar aforesaid in a manner to lock said movable clutch member.

2. An adjustable handle-bar of the class described, consisting of a bar, a collar upon said bar, fixed and movable interlocking clutch members, a spring to permit of the disengagement of said movable member by the rotary movement of said handle-bar, a spring-actuated key-lever pivoted to said movable member and adapted to engage the collar upon the bar in a manner to lock said clutch member against movement.

3. An adjustable handle-bar consisting of a bar having an enlargement thereon, a head in which said enlargement operates, serrations upon said head and enlargement registering with each other, a spring-actuated serrated movable clutch member mounted upon the bar and adapted to engage the serrations of the head and enlargement, a key-lever pivoted to said movable member and adapted to operate through an orifice in said clutch member and engage a collar upon the bar in a manner to lock said clutch.

Signed at Bridgeport, in the county of Fairfield and State of Connecticut, this 26th day of October, A. D. 1896.

ROBERT R. BALL.

Witnesses:
C. M. NEWMAN,
R. H. NEWMAN.